US007515295B2

(12) United States Patent
Kremer et al.

(10) Patent No.: US 7,515,295 B2
(45) Date of Patent: Apr. 7, 2009

(54) TABLE-DRIVEN APPROACH FOR INSERTING AND PRINTING TABS

(75) Inventors: Karl Heinz Kremer, Rochester, NY (US); Robert K. Holzwarth, Palmyra, NY (US); Andrea M. Roberts, Churchville, NY (US)

(73) Assignee: Eastman Kodak Company, Rochester, NY (US)

(*) Notice: Subject to any disclaimer, the term of this patent is extended or adjusted under 35 U.S.C. 154(b) by 912 days.

(21) Appl. No.: 10/767,589

(22) Filed: Jan. 29, 2004

(65) Prior Publication Data

US 2004/0184103 A1 Sep. 23, 2004

Related U.S. Application Data

(60) Provisional application No. 60/446,876, filed on Feb. 12, 2003.

(51) Int. Cl.
*G06K 15/02* (2006.01)

(52) U.S. Cl. .................................... 358/1.18; 358/1.11

(58) Field of Classification Search ................ 358/1.18, 358/1.11, 1.15, 1.12, 1.16, 448, 453; 382/297; 345/777, 838, 333; 715/500, 513, 522; 283/37
See application file for complete search history.

(56) References Cited

U.S. PATENT DOCUMENTS

| | | | | |
|---|---|---|---|---|
| 5,337,161 | A * | 8/1994 | Hube | 358/448 |
| 5,946,461 | A | 8/1999 | Landry et al. | |
| 6,177,933 | B1 * | 1/2001 | Young | 715/805 |
| 6,407,820 | B1 | 6/2002 | Hansen et al. | |
| 6,509,974 | B1 | 1/2003 | Hansen | |
| 2001/0043365 | A1 | 11/2001 | Kremer et al. | |
| 2001/0046059 | A1 * | 11/2001 | Motamed et al. | 358/1.12 |
| 2002/0033595 | A1 * | 3/2002 | Sapienza et al. | 283/37 |
| 2002/0075504 | A1 * | 6/2002 | Fernandez et al. | 358/1.15 |
| 2002/0131075 | A1 | 9/2002 | Kremer | |
| 2003/0043211 | A1 | 3/2003 | Kremer et al. | |
| 2003/0043212 | A1 | 3/2003 | Kremer | |
| 2003/0197882 | A1 * | 10/2003 | Tsukuba et al. | 358/1.12 |
| 2003/0222916 | A1 * | 12/2003 | Kuwata et al. | 345/777 |
| 2004/0085583 | A1 * | 5/2004 | Yamamura | 358/1.18 |
| 2005/0146750 | A1 * | 7/2005 | Moroney et al. | 358/1.18 |
| 2005/0206954 | A1 * | 9/2005 | Schwier et al. | 358/1.16 |
| 2006/0095838 | A1 * | 5/2006 | Nguyen et al. | 715/522 |

* cited by examiner

*Primary Examiner*—King Y Poon
*Assistant Examiner*—Allen H Nguyen
(74) *Attorney, Agent, or Firm*—Donna P. Suchy

(57) ABSTRACT

A computer program operates a printer to insert tabs into a multipage document. The physical tabs are stored in one of printer's insert bins. A graphical user display shows a bank of tabs in a layout table. A tab is activated by specifying a page for the tab. Text and graphics may be entered on the tab or selected from templates for labels and style. A layout template stores data on the layout of one or more standard banks of tabs. The computer program automatically balances the number to tabs and automatically deletes unused blocks of tabs.

6 Claims, 10 Drawing Sheets

TABLE-DRIVEN APPROACH FOR INSERTING AND PRINTING TABS

BACKGROUND

This invention addresses a problem of providing the correct number of tabs for a tabulated document and includes an apparatus and method for selecting a desired number of tab media and balancing the selected number to provide a professional appearance for the printed document.

Tabulated documents have tabs that extend from one edge of the document. The tabulated edge of the document is, by custom, opposite the bound edge of the document. If the document is a conventional book that is bound on its left hand side, then the tabs extend from the right edge. If the document is bound at it top edge, the tabs extend from the bottom edge. The appearance of a document is enhanced when the tabs are balanced by having its tabs equidistantly spaced along the tabulated edge. Tabs are normally pre-cut into ordered banks with a fixed number of tabs per bank. Tabs may be inserted into a document automatically and others have an apparatus for discarding unused tabs. However, the appearance of the document is improved by equally spacing the tabs from each other along a tabulated edge. At present, operators of printing machines manually space or balance tabs by removing selected tabs from one or more banks before the tabs are inserted into a document.

Tab stock is pre-cut and manufacturers often provide ordered banks of consecutive tabs with the position of each consecutive tab being offset from a previous tab by an amount approximately equal to the width of the tab. For example, one ordered bank of tabs for a page of a given size may include five tabs, with each tab having a tab portion of about one fifth the tabulated edge of the document. If the ordered bank has ten tabs, then each tab has a tab portion of about one tenth the length of the tabulated edge. In a tabulated document, as the page number increases, the position of the tab along the tabulated edge moves down the edge (or from left to right). Once the tab position reaches the bottom of the page (or the right edge), there is a full bank of tabs. The number of tabs in a bank may range from one or two to five or ten or more tabs. A print job may not use a full bank of tabs.

For example, suppose a document has three chapters and a full bank of tabs has five tabs. Two of the five tabs are unused and have to be discarded from the printed document. The system that performs the print job needs a way to determine which tabs are actually used, and which have to be discarded while the job is printing (for tabs from the middle of the bank), or after the job is printed (for tabs at the end of the bank). The problem can be solved manually by removing two of the five tabs from each of a number of banks of tabs that corresponds to the number of copies made of the document. Then the system will pull the remaining tabs from the tab storage bin and insert the tabs in the desired location in a manner well-known in the art. Users also want and often need the ability to place text on the cut tabs without having to determine the printable area every time a new tab is added to a document, and without having to place the text manually on the tab so that it stays within the imageable area.

Document software such as ImageSmart Document Mastering™ from Heidelberg Digital LLC or Rochester, N.Y. is a collection of plug-ins based on Adobe Acrobat and a portable document format (PDF) workflow. The software is capable or creating tabs for PDF documents. With the current ImageSmart Document Mastering™ tools, the problem of discarding unused tabs has been solved by adding the unused tabs to the document and selecting an alternate finishing device for those pages. The tab text is usually placed on the tab by manually moving the text (e.g. with the Acrobat TouchUp Object Tool) to the desired location or by using document creation applications (e.g. MS Word) to create the tabs. Such documents are then converted to PDF before they are used with the ImageSmart Document Mastering™ software.

Others have attempted to solve this problem by counting the number of tabs in a bank (e.g. a bank of five tab stock is used in a document, only three tabs are actually used in the document, so the printer has to kick out five−three=two tabs). The user no longer has to keep track of how many tabs are used, and which of the tabs have to be kicked out. Also, text is placed automatically, removing the guess-work from the process of manually placing text. When doing this manually, the user has to be aware of how many tabs have already been used in the document, determine the position of the text on the tab either by calculating it or looking the position up in a table that was pre-calculated and then using either Acrobat tools and a relatively complicated workflow, or a third party tool to actually place the text on the tab.

SUMMARY

The invention is a computer program that is operated on a controller that controls a printer. As such, the invention also includes a printer that operates in accordance with the computer program. The program provides a series of steps (method) that generate a tabulated, multipage document. The steps include one or more optional preliminary steps including establishing templates for the layout of pre-cut tabs, text for the tabs and style (fonts) for the text. The program includes a tab creation tool. That tool has a table that receives information for layout, text and style. The information inserted into the table may come from the user or from one or more of the templates previously stored by the user. Each entry in the table represents a tab. The location of the tab is specified with reference to a reference location such as the the top edge, the top right hand corner, or the bottom left hand corner. The user may enter the text for each tab and the font for the text if label and style templates have not been selected. The creation tool lets the user select the page location in the multipage document where the tab is inserted and specifies whether the tab is located at that page, before, or after it.

The creation tool lets the user activate one or more tab positions in the table. Active tabs are inserted into the document; inactive tabs are discarded. Tabs are normally inserted in banks or ordered sets. A tab in a bank is activated by selecting the page where the tab is inserted. The program instructs the printer to discard inactive tabs. The program automatically detects full banks of inactive tabs and removes them from the document before the document is printed.

With this invention it is no longer necessary for the user to know how many tabs are in a set. If the document specification asks for a certain tab stock, the system automatically loads active tabs and discards unused tabs. It will discard tabs from within a bank; so that tabs are balanced (use only tabs 1, 3, and 5 from a five bank tab stock). The latter feature is not possible with prior art solutions that just discard unused tabs at the end of a print job.

This invention is especially useful in larger print systems that have dynamic tab handling. The invention has three important features. One is a table driven Tab Creator that activates one or more tabs in a bank of tabs without regard to the number of tabs in a bank. This tool uses blank lines to force tab kick-out and to remove unused banks of tabs. A second feature is a preview display to verify that tab text can be rendered on portions of the tab that can receive images, i.e., imageable area. A third feature is a use of the tab position as identifier for a tab in a bank of tabs.

DRAWINGS

DETAILED DESCRIPTION

Figure 1:
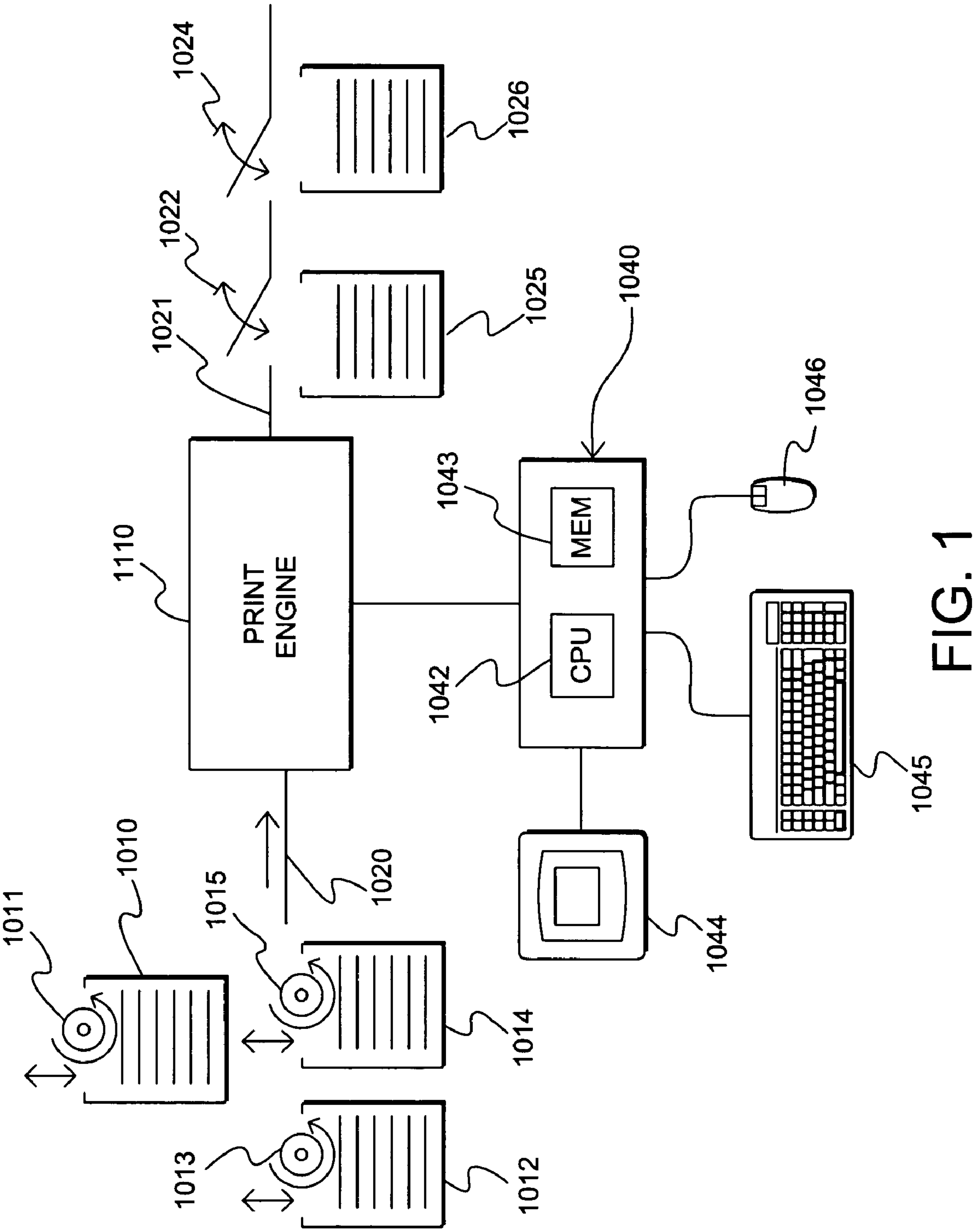
FIG. 1 is a schematic view of a printer with the invention.

FIG. 1 shows a schematic layout of printer 1110 equipped with the invention. The figure and the following description are generic for printers and are not limited to the particular details provided herein. Those skilled in the art understand that printers may have many different configurations. As such, the following description is provided to enable one skilled in the art to understand the environment in which the tab creation feature of the invention is employed. See also FIG. 9. Exemplary printers include the Digimaster.™. Digital High Volume Printer manufactured by Heidelberg Digital, L.L.C., located in Rochester, N.Y. and the NexPress.™. color printer manufactured by NexPress, Corporation, located in Rochester, N.Y.

A printer 1110 has three or more media input bins 1010, 1012, and 1014. One of the input bins holds the media on which a multipage document is printed, such as white bond paper. The other bins hold other media stock such as tab stock or other stock. Rollers 1011, 1013, and 1015 are moveable into and out of contact with the top of the stacks of media for withdrawing the media from the bins and placing the media on a conveyor 1020. The printer 1110 receives the media from the conveyor 1020 and prints the desired text onto the media. After printing, the printed media is placed on a discharge conveyor 1021 for travel to one or more discharge bins 1025, 1026. Gates 1022 and 1024 arc operable to send the media into one or the other bins.

A controller 1040 is part of a job preparation station 116 (FIG. 9) and controls operation of the printer 1110. The controller has a central processing unit 1042 and one or more memory units 1043. The memory unit(s) includes random access memory and read only memory for holding data, system programs and application programs to operate the printer 1110. The programs run on the printer 1000 are under control of an operator who has a display terminal 1044 and input devices such as a keyboard 1045 or a mouse 1046. The tab creation system of the invention is a computer program that is stored in a memory unit 1043. In one embodiment the tab creation program is a plug-in program that is compatible with Adobe Acrobat or other platform independent printing programs.

Figure 2:
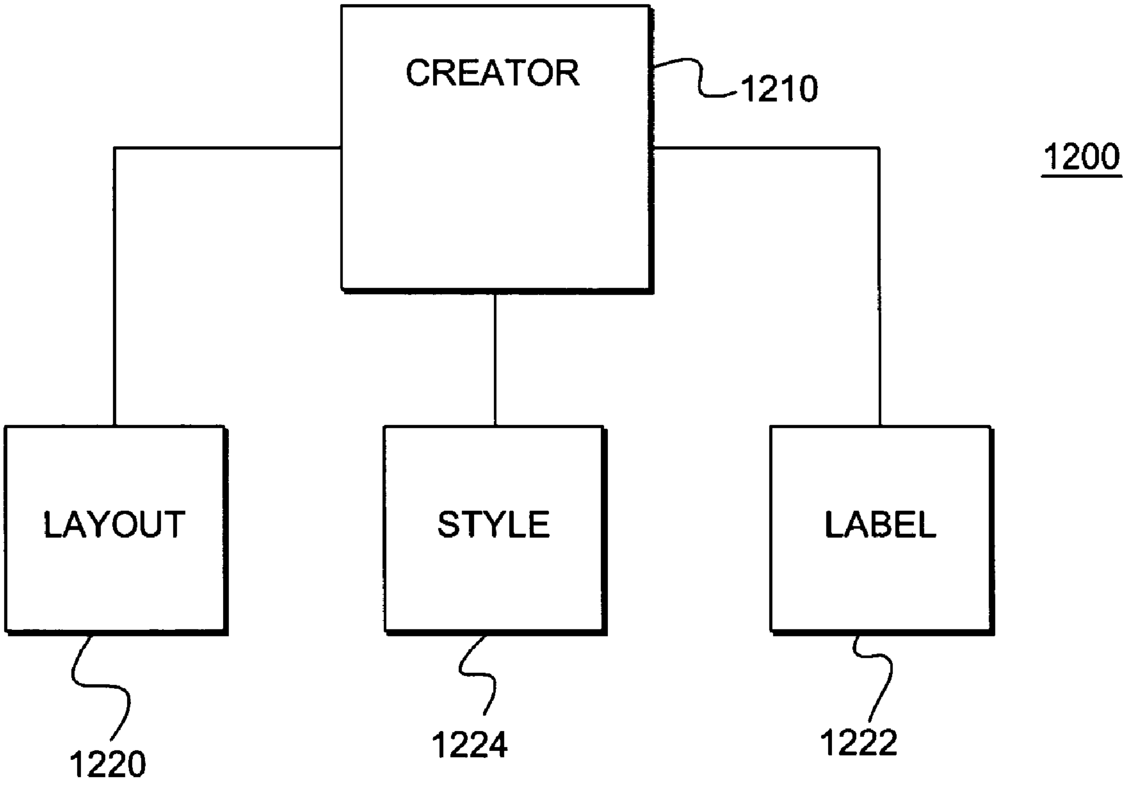
FIG. 2 is schematic view of the software modules of the invention.

The tab creation system 1200 of the invention is shown is schematic form in FIG. 2. The tab creation system 1200 is a computer program. The terms "system" and "program" are used interchangeably for tab creation system/program 1200. It operates as a plug-in to the Adobe Acrobat program. That program is used by a print shop to convert files originated in different programs into files with a portable document format (PDF). The system 1200 includes several software modules that run on the job preparation workstation 116. The modules include a Tab Creator 1210, a Tab Layout Template Editor 1220, a Label Template Editor 1222, and a Tab Style Editor 1224. The Tab Creator 1210 creates tab pages that are inserted into a document. It can create custom tabs for a document or create a bank of tabs from known tab stock and label and style templates.

Tab Layout Template

Figure 4:
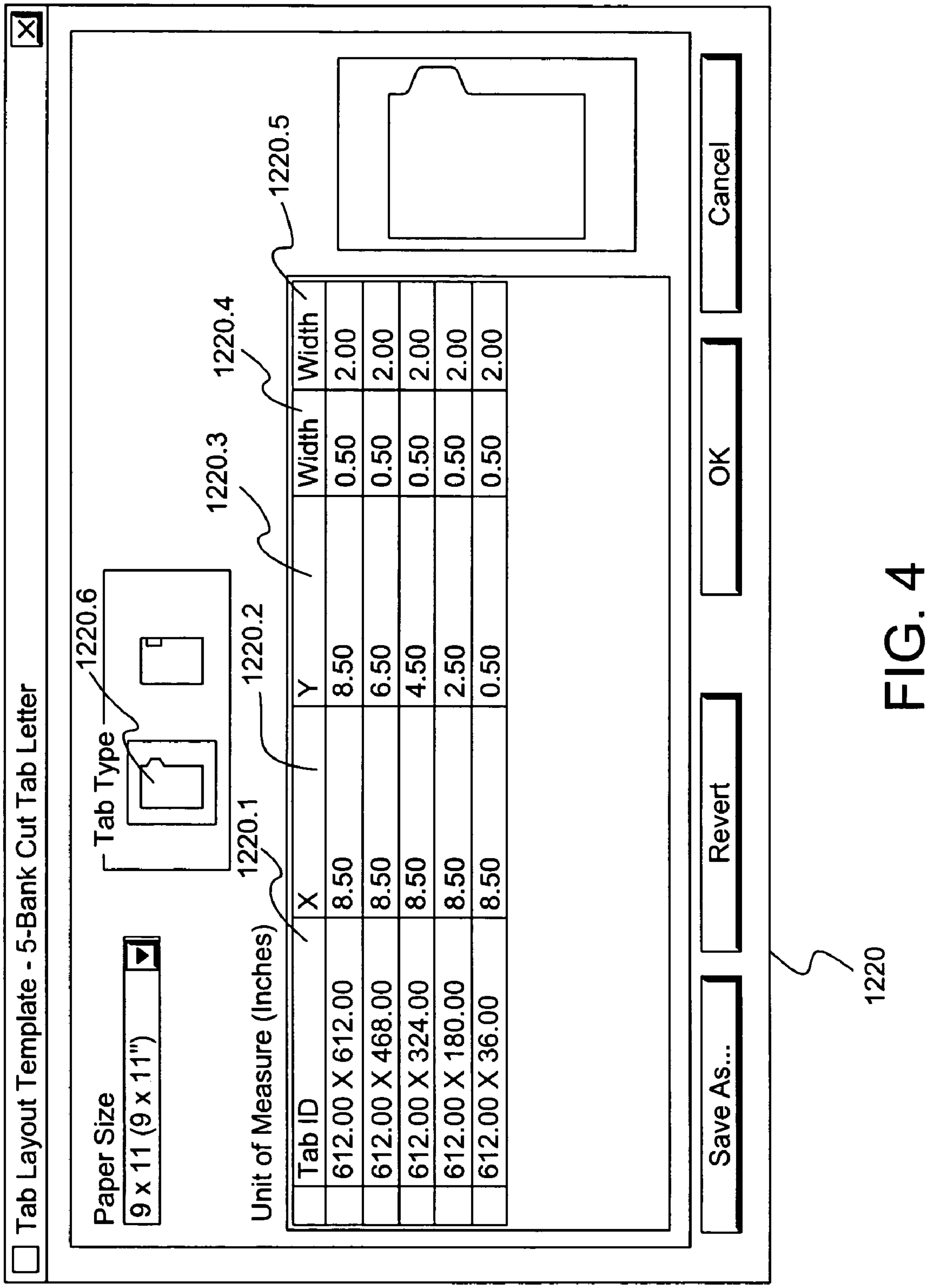
FIG. 4 depicts a layout menu screen

The Tab Layout Template Editor 1220 of FIG. 4 is a graphical user interface for the system/program 1200 that enables the system/program to receive and store information about the tab stock used. A Tab Layout Template defines tabs for a document. The Layout Template stores important information including:

1. Media name that may include the name of the manufacturer or the tab and the manufacturer's model number. This information is used to identify to the printer the media for the tab stock. It is stored in column 1220.1.

2. Tab location including the vertical and horizontal distance to the lower left corner of the sheet. These data are the effective x and y coordinates of the tab corner. These data are stored in columns 1220.2 and 1220.3.

3. The imageable area on the cut tab including the vertical and horizontal size of a graphic or text box that describes the imageable area including its width and height. The origin of this "box" is the "location of tab" coordinate relative to the lower left corner of the sheet—(x/y). For bleed tabs the definition of the imageable area is different. This data is stored in columns 1220.4 and 1220.5.

4. Tab type (bleed or cut tab) is stored in column 1220.6.

5. Other information about the tab stock may be added to the Tab Layout Template Editor without storing the number of tabs. Only the tab positions are stored.

Figure 5:
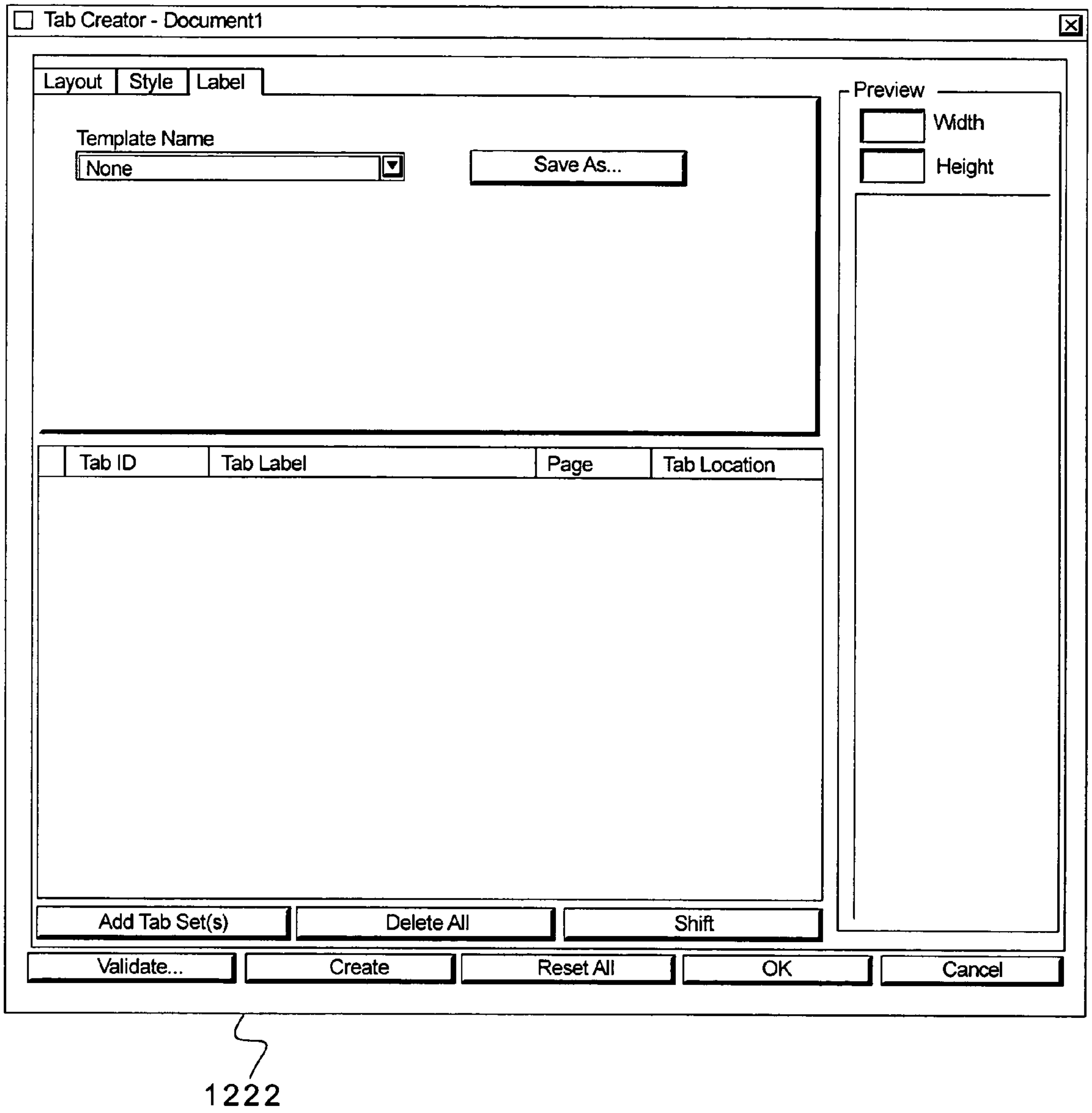
FIG. 5 depicts a label menu screen
Figure 6:
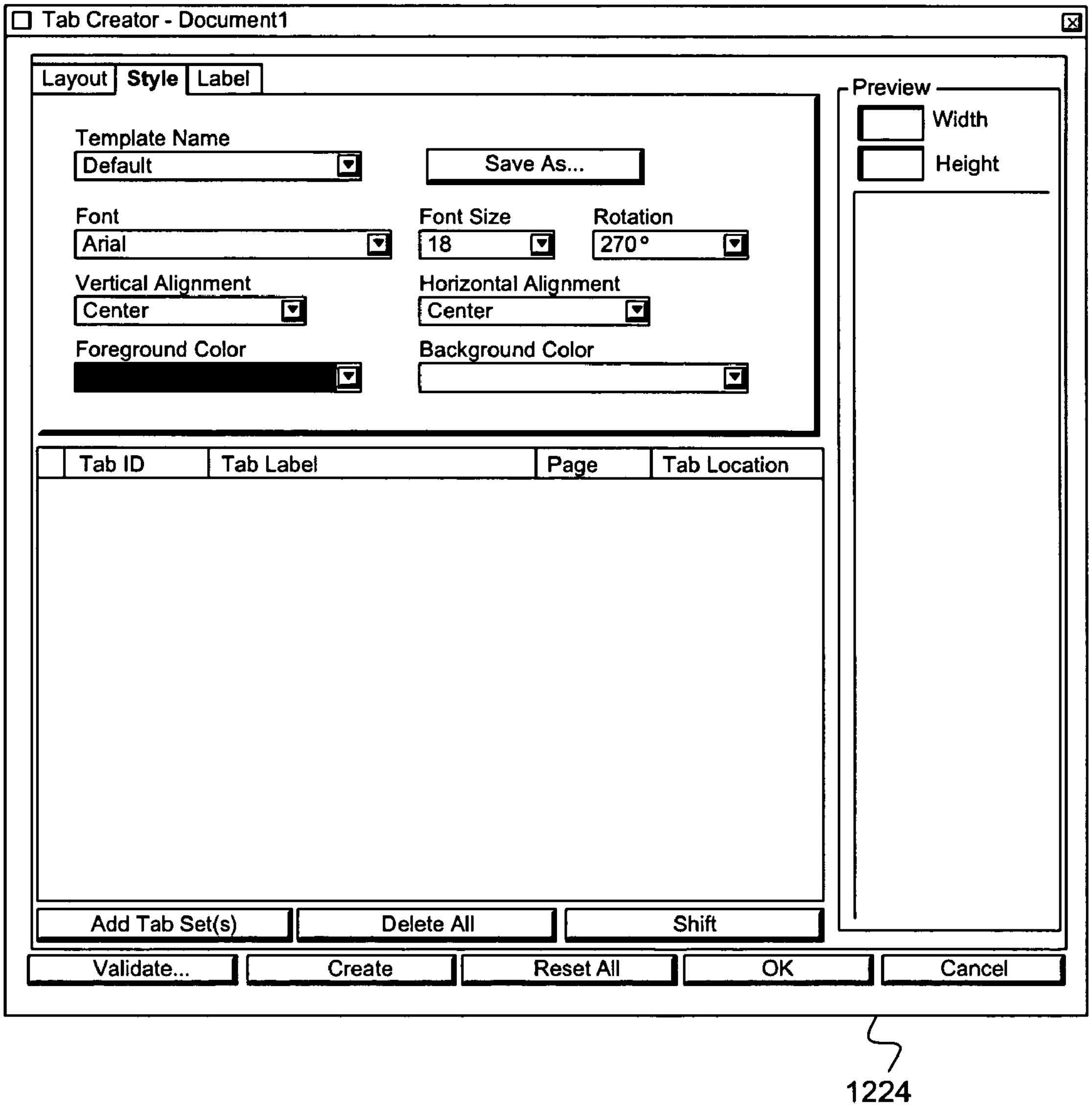
FIG. 6 depicts a style menu screen

The Tab Label Template 1222 (FIG. 5) is a graphical user interface for the system/program 1200 that enables the system/program to receive and store information about text that will be printed on the tabs. Typical text may include numbers, letters, or words, such as Chapter 1, Chapter 2, etc. The information entered into and stored by the Tab Label Template includes text or labels.

Tab Style Template 1224 (FIG. 5) is a graphical user interface for the system/program 1200 that enables the system/program to receive and store information about the font name (e.g. Arial, Times Roman), the font size and the font style (bold, italics, etc.) and orientation (horizontal, vertical).

For every tab stock that is added to the system, the user measures the dimensions and location of the tab imageable area for every tab in a bank. This information is entered into the system via the Tab Layout Template Editor 1220. When the editor is accessed to enter a new tab stock template, it will ask for the tab stock name, the paper name, and it will provide a first blank line to receive information about a first tab in a bank of tabs. The user will enter information about the horizontal position, vertical position, and tab width and tab height. After the user fills in the information for the first tab, the system creates a new blank line for the next tab. When all the tabs for a bank of tabs are entered into the system (and the rest of the information on this dialog is filled in or selected), the system stores this information in an internal data structure, which will then be converted to a disk file for persistent storage. This information may be stored as a linked list, so that a user does not have to know the number of tabs in a bank in order to access the individual elements.

The Tab Layout Template Editor 1220 can automatically fill in some of the information when a new entry is created. For all practical purposes, the only difference among the tabs is the vertical position of the tab for right edge tabs or the horizontal position of the tab for bottom edge tabs. As such, the Template Editor 1220 automatically fills in the horizontal position of all tabs. Also, for all practical purposes, the imageable area on the tab will be identical for all tabs in a bank of tabs and the Editor will automatically fill in the width and height for the new entry using the information of the current tab or the first tab. The user will have the ability to change these automatically created values.

Tab Creator

Figure 3:
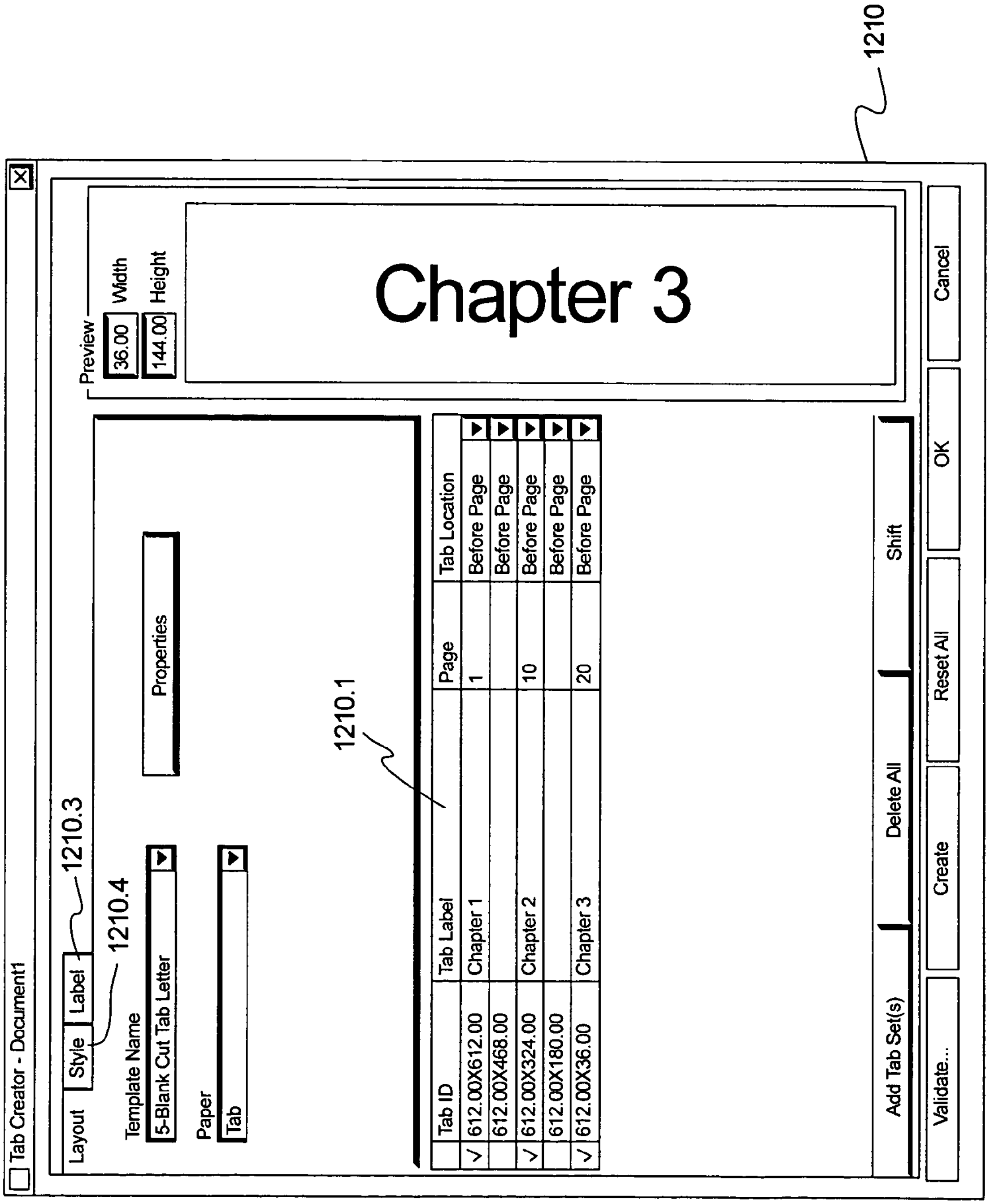
FIG. 3 is a view of a graphical user interface for operating the Tab Creator

The Tab Creator 1210 of FIG. 3 is a graphical user interface for the system/program 1200 that enables the system/program to receive and store information about the tabs for insertion into a document. The Creator Tool 1210 provides a display that lets the user select the desired tab stock, text and style. It includes a layout window 1210.1 that lets the user access the Layout Template 1220. Other windows 1210.4 and 1210.3 let the user access the Text and Style Templates, 1222, 1224, respectively. To define a tab for a document, the user selects data from the three templates 1220, 1222, 1224. Once the tab stock is selected, the first column of the tool imports all the tabs of the selected bank of tabs into the Tab Creator 1210 by copying the information from the Tab Layout Template line by line until the end of the tab style template definition is reached.

The Tab Creator also allows the user to select the page and the position where each tab is inserted. The user can either add tabs to an existing document, or create a new document containing only the tab pages. If a new document is created, the system will add one new tab page after the other to the newly created document, otherwise the system will behave the same as if the tabs are added to an existing document. The remaining discussion concerns the case where tabs are added to an already existing document.

In order to add tabs to an existing document the user selects the document and brings up the user interface of the Tab Creator 1210. The first parameter specified is the Tab Layout Template 1220. Once a template is selected the other parameters on this dialog can be specified. When a Tab Label Template 1222 is selected, then the tab text column for all tabs that will be created in a later step will be taken from the Tab Label Template. Otherwise the user has to enter the text for all tabs that will be created. When a Tab Style Template is selected, then the tab text that will be created will use the specified font attributes. If this information is not specified, then the Font Name, Font Size and Rotation controls will be enabled so that the user can select these attributes manually.

In one form of the invention, the Tab Creator 1210 is started by clicking on the "Add Tab Sets(s)" button. The system will add one full bank of tabs to the table, based on a predefined Tab Layout Template. The method is not based on the number of tabs in a bank. To add the tabs to the table, the program loads one line in the table of the Tab Creator for each entry in the template a selected Tab Layout Template 1220. When the end of the selected bank of tabs in the Tab Layout Template is reached, the Creator's table will contain one entry for every tab in the bank of tabs indicated in the template 1220. At first, the Creation Tool table will show information only in the "Tab ID" column. Its other columns will be blank, but the user may edit their fields. The "Tab ID" field for all tabs added to the table will contain the position of the tab specified in the "Tab Layout Template". The column may use a different name. The position may also be displayed in two columns (X and Y) instead of the one column shown in the screen shot. The operator has the ability to replace the position information in the "Tab ID" field with a more descriptive text. The contents of this field are considered to be a comment that is not used anywhere in the software besides on this user interface to help the user identify a tab.

In the Tab Creator 1210, every tab is either "Active" or "Inactive". All tabs placed into the table by the system will default to "Inactive". A tab can be activated by specifying a page number in the "Page" column. In addition to the page number, the user has to specify a position relative to this page number. A tab can be inserted before the specified page, inserted after the specified page or added to the specified page. The page position may default to a value that is either hard coded or specified by the user as a preference item. An entry can contain a blank tab label field, but still be active.

If the tab is inserted into the document, a new page with its page size and media name will be added to the document. If the tab is placed on an existing page, the page size will be modified to the size for the given media name. A table entry that is activated will either contain text from the given Tab Label Template, or an empty string that can be edited by the user.

In a second form of the invention, the table in the Creator will be initialized with page numbers selected by the user in Acrobat's thumbnail pane. The pages in Acrobat's thumbnail pane can either be selected manually, or through a software filter. This filter would use document or page attributes like page size, page content, and page specific print features and so on to select a number of pages in Acrobat's thumbnail pane. When the dialog is brought up with an active thumbnail selection, the table will contain the page numbers of the selected pages.

The system lets the user specify a default Tab Layout Template, and, if one is specified, then the system will automatically add as many banks of tabs of the default Tab Layout Template to the table as are required for the number of selected pages. If no default Tab Layout Template is specified, the user will select a Tab Layout Template and the system will then create as many banks of tabs of the selected Tab Layout Template as are required for the number of selected pages. To add the correct number of banks, the system will load the Tab Layout Template and will iterate through all its entries and will generate a new tab in the table for every entry. If there are still table entries with page numbers left that do not have an associated tab after a full bank is processed, the system will start over and process the entries in the Tab Layout Template again until no pages are left without an associated tab. If all specified page numbers are consumed and the Tab Layout still has entries left, the program will continue to add blank entries to the table until the end of the tab style template definition is reached.

When the user changes the Tab Layout Template selection, the system removes all tabs created in the previous step from the table and creates new banks of tabs using the new Tab Layout Template selection.

When the user edits the text in the table, the "Preview" control will be updated with every character that the user types. The preview control shows the size of the imageable area and the text entered so far, displayed with the font attributes selected for the tab. Therefore, the user can see if the given text fits into the area on the tab, or if the font attributes or the text have to be modified in order to make it fit.

The imageable area will be normalized (scaled) so that it fits into the screen area occupied by the preview control. The font size used will be scaled by the same factor.

If the tabs in one bank of tabs are not sufficient for the document (e.g. a 5-bank tab stock is used, but the document requires 12 tabs), the user can click on the "Add Tab Set(s)" button to add one more bank of tabs. The system will add the new bank the same way as the first bank by adding one new entry for every record found in the Tab Layout Template. The system may also add a visual indicator after the previous bank of tabs to make it clear that a new bank was created.

Internally, the system may store the different banks of tabs as linked lists (list of tabs in a bank), that are added to another linked list (list of banks in a document). This way, it is easy to identify all tabs that belong to one bank without regard to the number of tabs in a bank.

The table may contain blank lines (inactive tabs). All inactive tabs will be converted to "Insert" statements, which are sent to the printer. Every insert statement can contain an optional finishing device, which may be different from the finishing device used for the rest of the job. This feature will be utilized to discard the inactive (or unused) tabs to the purge exit e.g. bin 1025 or 1026. The purge exit may be defined on the job level, on the system level, or may even be defined on the Tab Creator 1210 (not shown).

This enables the user to balance tabs (e.g. use tabs 1, 3 and 5 from a five bank tab) by leaving the second and fourth record blank. The system automatically generates "insert after previous page to the purge exit" requests for these pages, so that they are discarded for example to the top exit at the correct position in the document: Tab 2 must be discarded before Tab 3 is used in the document; Tab 2 may be purged at any time after Tab 1 is used and before Tab 3 is used. It may be added as an insert after the page right before Tab 3.

The system automatically removes banks of inactive tabs from the document, so that full banks are not discarded. Although inactive tabs would be discarded during printing, it is inefficient to discard whole banks of tabs. The invention can detect a full bank, or for a "logical" bank that includes a bank of consecutive unused tabs overlapping a bank boundary. This check will be performed after the user has selected to print the document, but before the document is actually transmitted to the printer. Once a bank of inactive tabs is found, the bank is removed from the document.

Figure 7A:
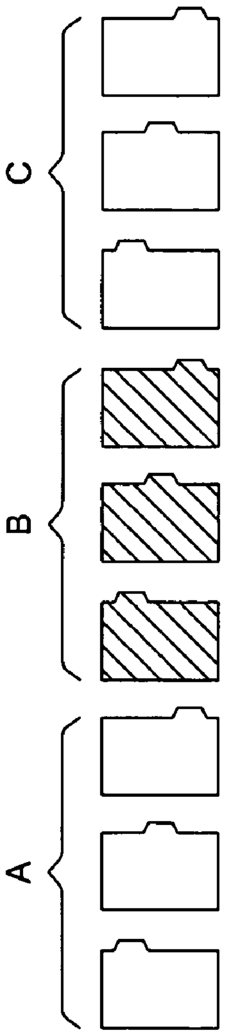
FIGS. 7*a*, 7*b* and 7*c* depict banks of active and inactive tabs
Figure 7B:
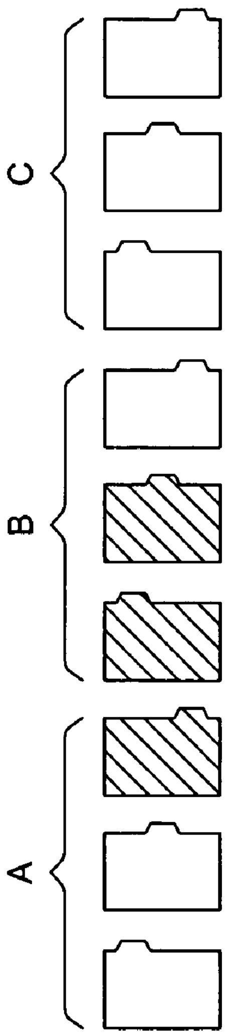

The system detects banks of inactive tabs. Examples of this function are shown in FIGS. 7*a*, 7*b*. To do this, the system stores every bank of tabs inserted into the document into a separate data structure (e.g. a linked list). By visiting all "banks of tabs" data structures and checking if all stored tabs are inactive, the software determines if any of the created banks contains only inactive tabs. In FIG. 7*a* there are three banks of tabs, A, B and C. Inactive tabs are cross hatched. Bank B has all its tabs inactive and can be deleted without inserting bank B into the document. FIG. 7*b* shows how a logical bank of tabs can also be deleted. There a logical bank of blank tabs include the last tab in Bank A and the first two tabs in Bank B To detect a logical bank of inactive tabs, the system compares the number of active and inactive tabs before the consecutive inactive tabs at the end of one bank to the number of inactive tabs at the start of the following bank. If the first number is equal to or smaller than the second number, then one bank of tabs can be removed.

Figure 7C:
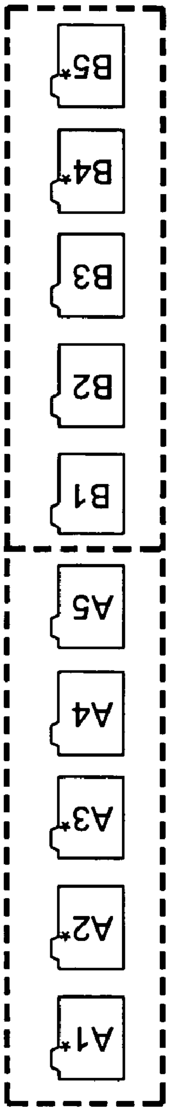

The example in FIG. 7*c* uses a bank of five tab stock. Active tabs are marked with an asterisk character in addition to the tab number; inactive tabs have only a tab number. The system detects the unused tabs at the end of the first bank (A4 and A5). To check for a full bank of inactive tabs that can be removed from the document, the software works backwards from the set of inactive tabs, starting with the first tab before the consecutive set of inactive tabs at the end of the bank. Starting with A3, until the start of the bank is reached (in this case A3, A2 and A1); the system will test if the tabs at the start of the following tab are inactive:

for A3 test if B1 is inactive->yes for A2 test if B2 is inactive->yes for A1 test if B3 is inactive->yes reached start of bank->remove the tabs at the end of the current bank and the tabs just identified at the start of the following bank from the document.

Note: The tab number listed is used to help clarify this example. At no time will the number be used in the software.

To allow the dynamic tab handling described in my copending U.S. patent application Ser. Nos. 09/454,562 and 10/075,680, the creation and placement of the tab text may be handled in two stages:

1. Place the text on the tabs as preview only when the user creates the tabs
2. Place the text on the tabs right before the document is sent to the printer to accommodate tab pages that have been moved in the document. The Tab Creator 1210 will close after generating the requested bank or banks of tabs.

The user may deactivate entries in the Tab Creator 1210 after the tabs have been created. By doing so, a tab page that was inserted will be removed from the document, and a page that was modified may or may not be modified to its initial state (old page size and tab content removed from the page). By marking an entry as inactive, it gets moved back to the pool of inactive tabs that can be activated by providing a page number and a position relative to this page. It is also possible to deactivate already created tabs by using Acrobat's "Delete Pages . . . " function and deleting the tab will convert the tab to a purged tab. In addition to placing text on a tab, it is possible to place images on tabs.

Figure 8:
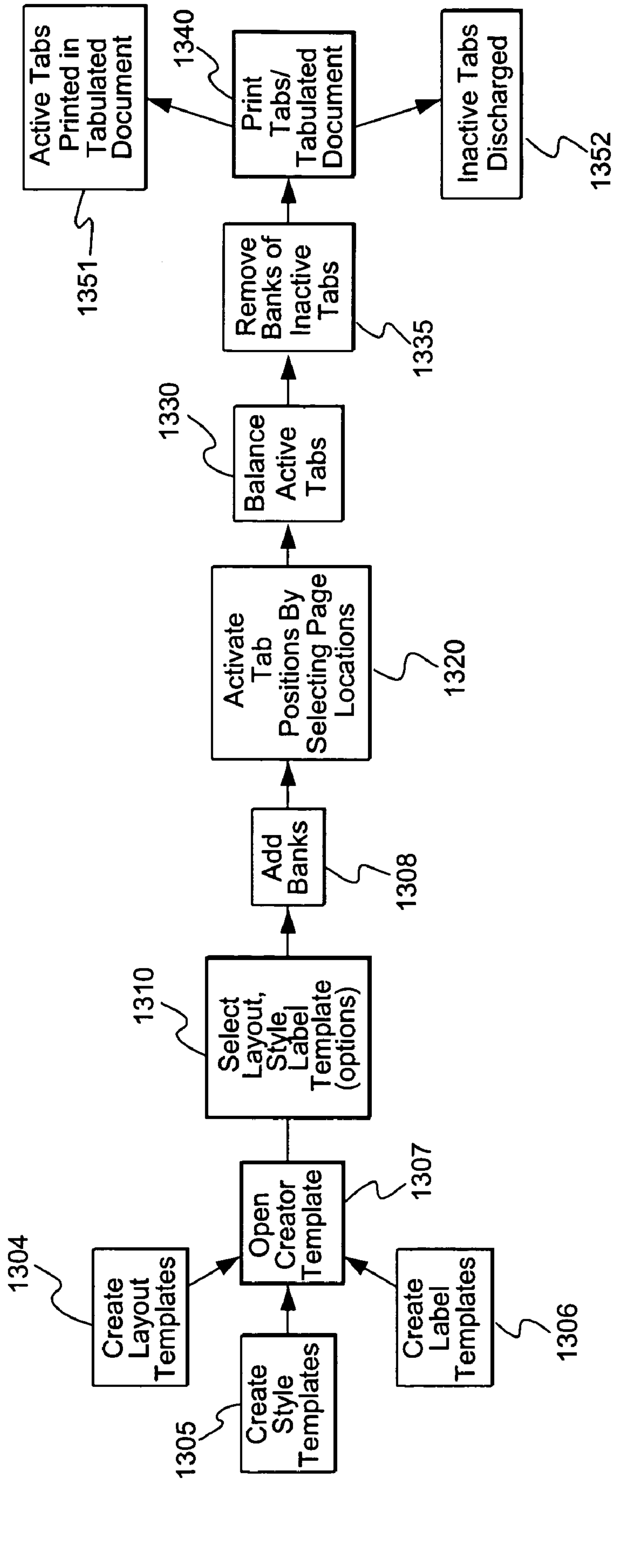
FIG. 8 depicts a flow diagram illustrating a preferred tab creation process.

The performance of the tab creation process is shown in FIG. 8. Prior to creating a tab, the user has the option to create one or more templates. In step 1304 the user creates the Tab Layout Template and enters a description (e.g. the manufacturer name and the order number) of the tab stock and other physical data to create a template for each bank of tabs. In step 1305 the user may create one or more style templates. These templates include the font type and font size of the text. In step 1306 the user defines Label Templates to create different texts for the tabs. Representative label texts are day of the week, months of the year, chapter numbers, etc. Creating Layout, Style and Label templates is optional but desirable. The user opens the Tab creator in step 1307. Tabs are created by operating the "Create Tabs" button. The Add Bank(s) function adds new "potential tabs" to the table. The user then has to enable those tabs that should be printed. If there are templates stored for Layout, Style and Text, the user selects one template for each category in step 1310. The tabs in a selected bank of tabs are displayed with their positions relative to the top edge. The user then activates one or more of the tabs (step 1320) by selecting a page relative to where the tab will be inserted. Page selection activates the tab and the user balances the tabs by selecting only those tabs that make up a balanced set of tabs and provide a professional appearance in the final document. The program also automatically detects unused banks of tabs and removes them from the document before the document is printed. The multipage document (not shown) with its tabs are printed with the command of step 1340. Active tabs are inserted into the document at their respective selected locations and the multipage document with the tabs is discharged (step 1352) in to a document bin. The unused tabs are discharged into another output bin (step 1351). The user may also store the document and retrieve it later for printing. All the information necessary to print the document, including its tab information, is stored with the document.

Figure 9:
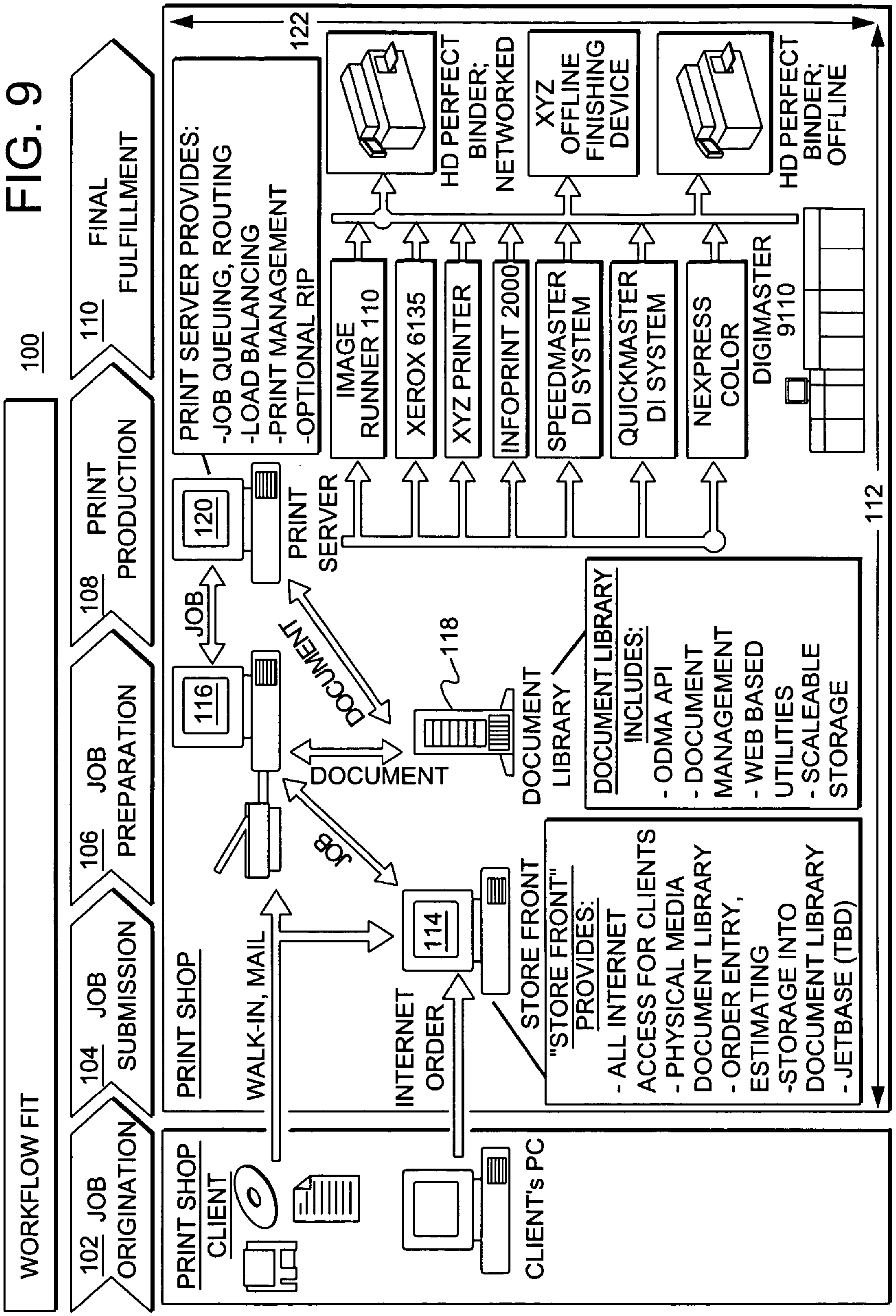
FIG. 9 depicts a flow diagram of a production printing window.

In order to have a better appreciation of the present invention, a discussion of the production flow in a production print shop is provided here. Referring now to FIG. 9, there is shown a flow diagram illustrating the production workflow 100 in a typical production print shop such as a commercial high volume copy or print shop. A workflow is defined as the tasks, procedural steps, organizations or people involved, required input and output information, and tools needed for each step in a business process. As will be discussed below, a workflow approach to analyzing and managing a business or process such as production printing can be combined with an object oriented approach, which tends to focus on the discrete objects and processes involved such as documents, pages, data and databases. For the purposes of this disclosure, the term "object oriented", when applied to the disclosed embodiments, does not imply that an object oriented programming approach is the only method of implementation of the disclosed embodiments.

In a typical digital print shop, there will be a network 112 of computer workstations 114, 116, servers 118, 120 and high volume output devices 122 which make up the computer network 112. The servers 118, 120 include network servers 118 and print servers 120. The topology of the network 112 is typically structured so as to align with the workflow 100 of the print shop. The network 112 may be implemented as a wired or wireless Ethernet network or other form or local area network. Further, the network 112 may include wired or wireless connections to wide area networks such as the Internet and connections to other local area networks such as through a virtual private network.

The production workflow 100 includes the procedural stages of job origination 102, job submission 104, job preparation 106, print production 108 and final fulfillment 110. Alternatively, one or more of these procedural stages may be combined as well as there may be other additional procedural stages. Job origination 102 is the procedural stage of receiving the documents and instructions, which together are defined as a "job", from the customer. Job origination 102 can occur when a customer physically brings his job, whether in hard copy or electronic form, to the print shop or otherwise transmits the job to the print shop, whether by phone, fax, postal mail, electronic mail or over a local area or wide area network such as over the Internet. Note that a job may contain more than one document and more than one set of instructions. For example, a job may contain many documents, each being one chapter of a book, along with a document containing a cover for the book. This exemplary job may include the instructions for producing the body of the book from the individual chapter documents and another set of instructions for producing the cover. In addition, as will be discussed below, there may be a third set of instructions for assembling the cover to the body of the book.

Job submission 104 is the receipt of the job by the print shop and the entering of the job into the print shops production system or workflow. Typically the instructions from the customer will be written down on a special form, known as a "ticket" or "job ticket". A ticket may also be electronically created and maintained. Furthermore, pre-defined tickets may be available for standardized instructions. For example, the shop may have a pad of pre-printed tickets with the instructions to duplicate the documents, three-hole punch the final output and assemble the punched final output in a three ring binder. If this is a common request by customers, such pre-printed tickets can save time and resources. All the order-taking clerk need do is fill in any customer specific details such as the number of copies to produce. Pre-defined tickets may help to standardize operations and prevent errors in the transcription of instructions from the customer. In very simple print shops, job submission 104 may simply be the receiving of the original documents and instructions along with the creation of a ticket, placing the job in a paper folder and setting it in a physical queue for later handling in subsequent procedural stages.

In print shops, which handle jobs electronically, job submission 104 requires entering the job into the shops electronic production system. For documents that are brought in by the customer as hard copy, the documents must first be scanned electronically into the shop's computer system. For documents delivered in electronic form, the document data files must be loaded on the shop's computer system and converted to a document format the production system can handle (e.g. PDF).

For the job submission stage 104, the computer network 112 may include one or more "store front" workstations 114. The store front workstations 114 are computer systems placed at the order taking desk, at a manned clerk's station or set out for customer self service use. These workstations 114 are used for the job submission stage 104 and typically will be configured to handle many different electronic media types such as floppy disk, compact disc, tape, etc. These stations 114 may also be configured to receive jobs over the Internet or other form of network connection with customers. Further, these workstations 114 are typically configured to read many different electronic file formats such as those used by the Microsoft Office.™. family of products manufactured by Microsoft Corporation, located in Redmond, Wash. or various other desktop publishing program file formats such as Adobe Pagemaker.™. or Quark Express.™. In addition, these stations 114 can also read "ready for printer" file formats, which will be discussed later, such as Portable Document Format.™.("PDF"), Postscript.™.("PS") or printer control language ("PCL"). Job preparation stations 114 can also accept image formats such as Tagged Image File Format ("TIFF"), bitmap ("BMP") and PCX. These stations 114 may also include a scanner 116 for scanning hard copies of documents into the computer system. Scanners typically are complicated devices to operate and some print shops may prefer to locate the scanners in the job preparation stage 106 for use solely by trained personnel as will be discussed below. In addition, the store front computers 114 also provide the ability to generate a ticket, electronically or in hard copy form, for the job containing all of the instructions for completing the production printing task. This process of generating the ticket may be automated, involving pre-defined tickets, manual or a combination thereof, and is discussed in more detail below.

Job preparation 106 involves preparing the documents for printing according to the instructions in the ticket. For documents that are submitted in hard copy form, job preparation 106 may include scanning the documents and creating a faithful and error free electronic reproduction. The documents, once in electronic form, must also be converted into a common file format that the print shop can use to both edit and print the documents (e.g. distilling to the PDF format). This alleviates the need for operators to deal with multiple different programs and eliminates the need to assemble complex documents together for printing using different electronic file formats.

For example, a customer may bring in two different documents, one being the body of a book and the other being the photographs to be inserted at specific pages. The customer may then instruct that the photographs be inserted at particular pages and that the final assembly has continuous page numbers added. The body of the book may be in Microsoft Word.™. format while the images of the photographs are in Adobe Photoshop.™. format. While the operator could figure out at which pages the images will be inserted and appropriately number the pages of the book and photographs using each individual software package, this is a very complex and time consuming process. It also requires that the operator be trained and familiar with a range of software packages and runs the risk that he will not be familiar with the particular package that the customer used. Therefore, it is more efficient to convert each of the various file formats into a unified format that allows the operator to prepare the job using a single software interface. In the preferred embodiments, all documents, whether provided in hard copy or electronically, are distilled or converted into a print ready file format. In the preferred embodiments, the Portable Document Format.™. is used as the ready for printer format, developed by Adobe Systems, Inc., located in San Jose, Calif.

A ready for printer file format is defined as a file format which contains both the data to be printed along with printer control instructions that can be directly interpreted by the internal processing engine of a printer or other form of hard copy output device in order to rasterize the data image onto the output media. Rasterization is the placement of image data at a specific location on the output media. Such file formats include Portable Document Format.™.("PDF") and Postscript.™.("PS") both manufactured by Adobe Systems, Inc., located in San Jose, Calif., as well as printer control language ("PCL"), manufactured by Hewlett Packard, located in Palo Alto, Calif. Examples of non-ready for printer formats include the native application file formats for personal computer application programs such as Microsoft Word.™. These file formats must be first converted to a ready for printer file format before they can be printed. Furthermore, some image file formats, such as the Tagged Image File Format ("TIFF") contain or use "bitmap" image data which is already in a format which specifies its output location on the output media and does not contain printer control instructions for interpretation by the internal processing engine of the printer and therefore, for the purposes of this disclosure, is not a ready for printer file format. By using a ready for printer format, rasterization of the image data can be delayed as close as possible to the final placement of the image data on the output media. This allows the most efficient use of the production print device 122 by allowing its internal control logic to optimize the rasterization process resulting in output that is more likely to match with the operator's expectations.

For the job preparation stage 106, the computer network 106 includes job preparation stations 116 and network servers 118 coupled with the storefront workstations 114 over the network 112. Herein, the phrase "coupled with" is defined to mean directly connected to or indirectly connected with through one or more intermediate components. Such intermediate components may include both hardware and software based components. The job preparation stations 116 preferably execute workflow management software, described in more detail below, which allows the operator to manage, edit and print jobs. The network server(s) 118 may include a document library which allows manipulation, management, storage and archiving of jobs, or their respective documents and/or tickets, as well as facilitates and manages the flow of jobs from the store front computers 114 to the job preparation stations 116 and from the job preparation stations 116 to the print servers 120 or the production output devices 122. Exemplary document libraries include DocSmart.™. document management system manufactured by MosaicSoft, Inc. located in Laguna Hills, Calif., Intra.Doc.™. document management system manufactured by Intranet Solutions, Inc., located in Eden Prairie, Minn. and the DOCFusion document management system manufactured by Hummingbird, Inc., located in York, Ontario, Canada. In the preferred embodiment, the job preparation stations 116 are Imagesmart® Workstations, manufactured by Heidelberg Digital, L.L.C., located in Rochester, N.Y. Alternatively, an appropriate computer hardware platform such as that comprising a Pentium® class processor or better, manufactured by Intel Corporation, located in Santa Clara, Calif., 64 megabytes of RAM or more, a 20 gigabyte hard disk or larger and appropriate display device may be used. Further, in the preferred embodiment, the network servers 118 preferably comply with the Open Document Management Architecture ("ODMA") standard and provide document manage merit capabilities and scaleable storage.

The job preparation workstations 116 also provide the capability of the print shop to add value to the print production process by offering services to the customer. Such services include the ability to modify documents provided by the customer to add features that the customer could not or would not add himself. Such features include adding page numbers across multiple documents, bates numbering, adjusting page layout for tab stock and aligning the output to account for binding. Further, the job preparation stations 116 provide the capability to fix errors in the documents such as removing artifacts in scanned images and masking over unwanted text or markings. The job preparation stations 116 can also be used to prevent inaccuracies in the finished output caused by the printing or binding process. Such inaccuracies include binder's creep, which happens after a document is imposed into a booklet/pamphlet using a signature imposition. Binder's creep occurs when the placement of the images on the paper fails to account for the thickness of the binding as a function of the number of pages in the book causing the image on the pages to shift inward as you get closer to the cover. Binder's creep is prevented by shifting image slightly when performing the signature imposition on the document. In addition, the job preparation station 116 allows the operator to manage and layout the document pages for final output, also known as "imposition" and "signature imposition". In addition, the operator can shuffle pages, reverse pages, insert blank pages, trim and shift pages, create bleeds and place multiple pages on a sheet, also known as "n-up" to create proof sets, brochures or pamphlets, etc. Further, the job preparation station 116 permits the operator to add annotations to the document such as bates numbers, page numbers, logos and watermarks. All of these services add value to the final output. Formatting and other modifications to the document can be globally applied to the entire document, such as a shifted margin or may be applied only to select pages. Such alterations to the document are known as page features or attributes. Further, these alterations are also known as page exceptions since they typically override specific instances, of the original document formatting as set by the customer.

The next stage in the print production workflow 100 is the print production stage 108. In the print production stage 108, the final form of the documents for printing is sent to a print server 120 which will distribute the job to the final output device 122. In manual print shops, this stage 108 would be similar to an operator manually taking the ready for production job over to the desired output device 122 to start the job.

The print production stage 108 manages the output resources of the print shop. Such management includes queuing jobs to the proper devices 122 in the shop, routing jobs to available devices 122, balancing the load placed on the various devices 122, and pre-processing jobs, such as splitting or RIP'ing the job, prior to sending it to a particular device 122. RIP stands for Raster Image Processor and is the hardware and/or software that converts ready for printer data into raster images. It is also a common term for rasterizing a page image on to the output media.

The print server 120 used in the print production stage 108 is coupled with the job preparation stations 116 and the network server 118 over the network 112. Further, the print server 120 is coupled with the various output devices 122 in the print shop. Note that some output devices 122 may not support electronic transfer of the data to be output and may require a manual step for operation. Such devices may include a special binding machine that requires that the partially finished documents be manually transferred to the binding machine to complete the production. The print server 120 is preferably implemented as a separate computer coupled with the network 112, however, software based print servers running on a network server 118, job preparation station 116, output device 122 or store front workstation 114 may also be used. In the preferred embodiment, the printer server 120 includes an independent computer workstation, typically running a UNIX or Windows NT operating system, a software print server engine and a software print server application. The print server application offers the user interface ability to configure and manage the print server operation. The print server engine performs the automated processes of the print server. These processes include spooling and queuing jobs and job content (i.e. the document), directing the jobs to specific production output devices based on the attributes of the print job and how these attributes are satisfied by the print engine, load balancing jobs among the various production output devices to keep all printers fully utilized, e.g. to split color from black and white jobs, and acting as a communication gateway where it can accept multiple input communication and print protocols translating them to the communication and print protocol the production output device 122 understands.

The final stage of the production printing workflow 100 is the final fulfillment stage 110. The final fulfillment stage 110 is the stage where the finished output is produced on the production output device 122. A production output device is a computer output device, such as a printer, designed for high volume production of printed documents. Such devices preferably include the ability to produce large quantities of documents with mixed media types and various degrees of finishing, such as stapling or binding, at very high speed. Exemplary printers include the Digimaster.™. Digital High Volume Printer manufactured by Heidelberg Digital, L.L.C., located in Rochester, N.Y. and the NexPress.™. color printer manufactured by NexPress, Corporation, located in Rochester, N.Y.

Figure 10:
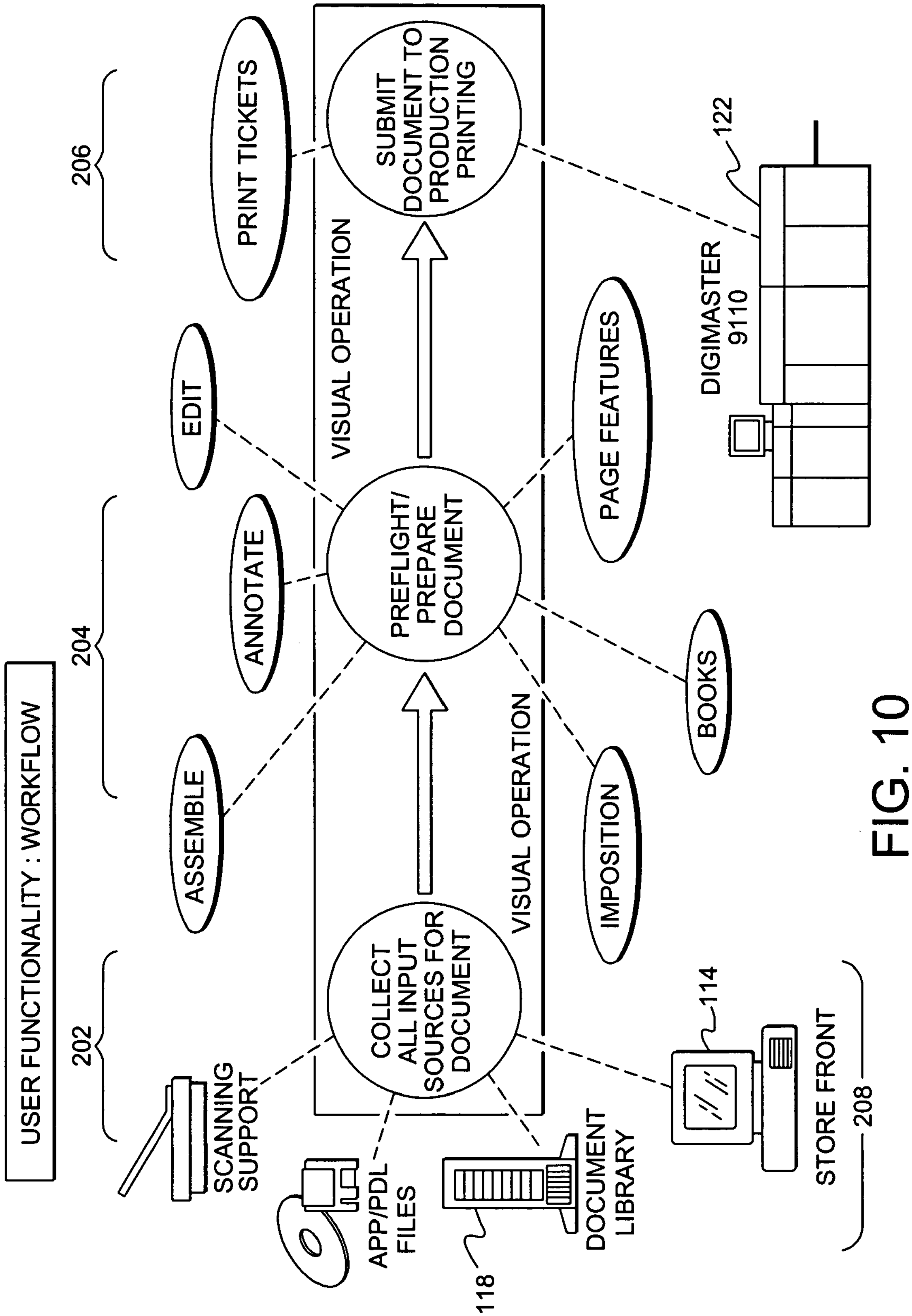
FIG. 10 depicts a flow diagram showing a functional work flow

Referring now to FIG. 10, there is shown a flow diagram showing the user functionality workflow 200 of the preferred embodiment job submission and preparation stages 104, 106. The user workflow 200 includes an input source stage 202, a preflight stage 204 and a production stage 206. In the input source stage 202, all of the documents of the job are collected together from the different input sources 208. As detailed above, all of the collected documents are converted to a ready for printer format, preferably a Portable Document Format.™. This conversion can be a manual or automated process or a combination thereof. For example, a special directory can be created on the network server 118 where data files in various file formats can be placed, for example, by the clerk who accepts the documents from the customer and inputs them into the store front workstation 114. Automated logic, which watches this directory, will see the placement of files and automatically convert them (or flag them for manual conversion) into a ready for printer format. Any documents that the automated logic cannot handle can be flagged for manual conversion. The converted documents are then passed to preflight stage 204 where they are prepared for production. This transfer of converted documents can occur by moving the documents to a special directory on the network server 118 where they can be accessed by the job preparation stations 116 or by transmitting the documents to the job preparation station 116. This process can be manual or automated and may involve placing the documents in a queue of documents waiting to be prepared for production. Further, this process may include a manual or automated determination of the capabilities, skill level or training level of the various operators currently logged into the available job preparation stations 116 as well as the current load/backlog of job in their respective queues. Taking these factors into account, the job can be automatically or manually routed to the operator best able to handle the job both technically and in an expedient manner. This functionality can be implemented by creating an operator database which tracks the capabilities, skill level and training level of the various operators who work in the print shop. This database can be coupled with queue management software, which balances the loads/backlogs of job at each station 116.

In the preflight stage 204, the documents can be assembled, such as in a book, annotated, edited, imposed, or have page features applied. Once the documents are prepared for production, they are passed to the production stage 206. In the production stage 206, the prepared documents along with the production instructions (from the tickets) are submitted to the print server or directly to the production output device 122 using a file downloader such as the Print File Downloader.™. application program manufactured by Heidelberg Digital, L.L.C., located in Rochester, N.Y. This user functionality workflow 116 may be implemented as a combination of hardware, software and manually executed components and may involve one or more of the components detailed in the production printing workflow above.

In the preferred embodiments, the user functionality workflow is preferably implemented as a workflow management software program and interface executing on the job preparation workstation 116. The preferred workflow management software is visually oriented using an object oriented graphic user interface ("GUI") approach that integrates control of the workflow functionality in a single interface. While the visual and operational appearance of the management software is object oriented, the implementation of the software may be by an object oriented programming language or a non-object oriented programming language as are known in the art.

In the GUI interface, documents, tickets and other entities and operations (collectively "objects") are visually represented on the workstation 116 display, such as with icons, tree structures and pull-down menus, and may be interacted with using known devices and methods such as utilizing a keyboard, a mouse or a track ball to control a visually represented pointing device which is then used to click, select, drag and drop the displayed representations. Such manipulation of the visual representations results in manipulation of the underlying objects (documents, tickets, and other entities and operations). Furthermore, the GUI also permits creation and manipulation of relationships and associations among the various objects and visually displays such relationships and associations. Relationships and associations may be displayed, for example, using a hierarchical approach like a tree structure or file folder structure or using some alternate form of visual indication. It will be appreciated that graphic user interfaces are well known in the art and that there are many software development packages available, which can be used to develop a GUI. One such package is the Microsoft Foundation Class (MFC) available from Microsoft Corporation, located in Redmond, Wash.

Further, the preferred GUI utilizes a document centric approach providing a centralized viewing window for viewing documents being worked on. In the preferred embodiment, the document viewing functionality is provided by the Adobe Acrobat software program, manufactured by Adobe Systems, Inc., located in San Jose, Calif.

As was noted above, the workflow management software integrates applications that implement, control or manage the stages of the production printing workflow 100. These applications include inputting documents from various sources, document assembly including the creation and manipulation of books, document editing, document annotation, document library access on the network server 118, setting and manipulation of page features, creation and manipulation of job tickets and printing.

The workflow management software is capable of receiving input from various different sources. Such sources include hard copy originals input via a scanner, native application formats such as the Microsoft Office.™. Product suite and desktop publishing applications such as Quark Xpress.™., manufactured by Quark. Inc., located in Denver, Colo. and FrameMaker.™., manufactured by Adobe Systems, Inc., located in San Jose, Calif. Further, the software can accept Tagged Image File Format ("TIFF") documents as well as documents already in a ready for printer format such as PDF, PS or PCL. For hard copy input via a scanner, the software supports industry standard scanner interfaces, TWAIN, as defined by the TWAIN-group located in Boulder Creek, Calif. Using these standard interfaces, the workflow management software receives the scanned image data directly in the ready for printer format. An exemplary scanner for use with the preferred workflow software is the Imagedirect.™. Scanner manufactured by Heidelberg Digital, L.L.C., located in Rochester, N.Y.

Once documents are loaded into the workflow management software, tools are provided to perform value added services and prepare the documents for production. Assembly is the process of arranging or rearranging pages or adding or removing pages within a document. Assembly also includes imposition where page positions are forced such as when the first page of a chapter is forced to the front side of the paper. The workflow management software provides cut, copy, and paste and move functionality operable on 1 or more pages. This functionality is preferably implemented via pull-down menus, pop up dialog boxes or on screen option palettes or buttons as provide by the graphic user interface. In addition, the results of the respective operations are shown in a visual representation of the document in the centralized document-viewing window on the job preparation station 116 display.

The workflow management software further provides support for editing and annotating the document. Tools are provided for image object area editing of a scanned page including erase inside and outside an area, cut, move, copy and paste area as well as pencil erase. Page editing tools are also provided for editing on one or more pages including area masking and cropping. Tools are also provided for annotating documents including alpha-numeric and graphic annotations. Exemplary annotations include page numbering and bates stamping. The tools further provide for placing images behind the document content, also known as watermarking. Annotation can be performed on any portion of one or more pages. For alpha-numeric annotations, the font size and style are controllable. In all cases, the results of the respective operations are shown in a visual representation of the document in the centralized document viewing window on the job preparation station 116 display. In the preferred embodiments, edits or annotations can be created or manipulated by pointing to a visual representation of the document and/or pages within the document and selecting, dragging, dropping or clicking the representation and/or selecting from a menu of options, where the selection of a particular option causes the associated edit or annotation to be applied to the specified portions of the document. Alternatively, a palette of options may be displayed from which the user may choose an option to apply to selected portions of the document. Further, the interface may provide for a dialog box or other visual control for inputting control values for the edit or annotation such as the starting number of a bates range.

The workflow management software preferably provides further support for compound documents that are documents comprised of one or more other documents, such as books comprised of chapters or course packs comprised of one or more excerpted sources. Compound documents take advantage of the object oriented nature of the workflow management software. A compound document is a collection of one or more documents which have a particular ordering to them such as the chapters of a book. The Compound Document further contains an automatically generated assembled document which is a single document containing the whole assembled Compound Document. Tools are provided which allow simple management of the documents of a Compound Document, assembly and updating of the documents into the assembled document and selective document manipulation, such as selective printing, of the documents within the Compound Document. Tools are also provided which can interpret the content of the documents within the Compound Document and automatically generate a table of tabs in the assembled document. A compound document otherwise acts just like a document and can be edited, annotated, etc. and have tickets associated with it. Further, a compound document can contain other compound documents such as in the case of a multi-volume book. The individual documents and compound documents within the compound document further retain their independent existence and can be edited or printed independently of the Compound Document and shared with other Compound Documents with those edits being either automatically or manually updated into the assembled document within a particular Compound Document. The workflow management software further displays a visual representation, such as with a hierarchical or tree structure, showing the compound document and any associated documents and tickets. In the preferred embodiments, compound documents can be created or manipulated by pointing to the visual representations of one or more documents and/or a visual representation of a Compound Document and selecting, dragging, dropping or clicking and/or selecting from a menu of options, where the selection of a particular option causes the associated feature to be applied to the selected documents or compound documents. Alternatively, a palette of options may be displayed from which the user may choose an option to apply to selected compound documents. Further, the interface may provide for a dialog box or other visual control for inputting control values for the compound documents such as margin values. For example, a user may select one or more documents and then choose a create Compound Document option from a pull down menu. The workflow software then creates a visual representation of the Compound Document on the display showing the association of the compound document to the selected documents. Alternatively, the user may first create a visual representation of a Compound Document and then drag and drop the visual representations of one or more documents onto the Compound Document visual representation. The workflow software then creates the appropriate logical associations of the data for which the visual representations represent.

The workflow management software is also preferably programmed with data about the different production output devices 122 in the print shop or otherwise available and their capabilities or other equipment, such as finishing equipment, which can be utilized either automatically or manually. The software provides tools which allow the operator to set page features/formatting which are made possible by those specific capabilities. Such page features include the plex of the document such as duplex or simplex (double sided or single sided output), binding options, such as stapling or hole punching and the availability and control settings for handling tab stock or ordered media. The preferred embodiments preferably support all of the features of the Digimaster.™. line of high volume digital printers manufactured by Heidelberg Digital, L.L.C. located in Rochester, N.Y. In the preferred embodiments, these page features can be set by selecting or pointing to a visual representation of one or more pages and selecting from a menu of options, where the selection of a particular option causes the associated feature to be applied to the selected pages. Alternatively, a palette of options may be displayed from which the user may choose an option to apply to selected pages. Further, the interface may provide for a dialog box or other visual control for inputting control values for the feature such as the type of tab stock. Setting page features for specific pages encodes instructions to the production output device 122 for implementing those features within the ready for printer formatted file. When the production output device 122 receives the file for printing, it will interpret those instructions to implement the desired feature. For page features that the current device 122 cannot handle, the device 122 can signal the operator that manual intervention is required and direct the operator through the appropriate steps to implement the page feature and complete the job. This may include instructing the operator to remove partially finished documents and transfer them to a binding machine for finishing or instructing the operator to load a specific media type or tab stock into the device 122.

Tools are further provided by the workflow management software to support electronic versions of tickets for specifying production output device instructions and parameters, as well as other finishing steps which may or may not be automated, which are global to the document, e.g. job level features or global document attributes. These include such attributes as the general media type or color to use and the method of binding such as stapling. Tickets, also referred to as print tickets or job tickets, can exist independently of documents or compound documents as was mentioned above. They are independently visually represented on the display by the workflow management software. Tools are provided for manipulating tickets, such as saving, storing and associating them with documents or compound documents in addition to editing their options. In the preferred embodiments, tickets can be manipulated just like documents, using pointing, clicking, selecting, dragging and dropping. For example, a ticket can be associated with a document by selecting the ticket and dragging and dropping it on a particular document. The workflow management software then preferably visually displays the association by showing the ticket under the hierarchy of the document. Once associated, the options set by the ticket will apply to the associated document or compound document. The options represented by the ticket may be set by selecting the ticket to bring up a dialog box or pull down option menu, which displays the available options and allows modification of the option values. Tickets associated with documents can be manipulated with the document. For example, saving a document saves all of its associated tickets. Furthermore, the workflow management software provides the capabilities to create libraries of standardized tickets, which can be used, for example, to standardize procedures across multiple franchised print shops.

Finally, the workflow management software provides tools to send the prepared documents and any associated tickets to the production output device for final production. In the preferred embodiments, documents or compound documents can be sent to a production output device by selecting, clicking or dragging the visual representation of the document or compound document to a visual representation of the print server or output device. Alternatively, the user may select an appropriate option from a pull-down menu, pop up dialog box or button palette. The workflow management software supports standard interfaces and protocols to production output devices and print servers. Further, tools are provided for managing, selecting and monitoring multiple production output devices. These tools provide visual feed back of each of the devices status to the user.

Private PDF page objects can be used to store this kind of tab property information on a page level. This makes it possible to move the page in one document or copy it to other documents without having to keep track of which pages are printed on tabs. Furthermore, this page level data may be used for many purposes. For example, it may be necessary to consider the available space on the tab when creating the document. If at the time of the page creation it is assumed that a set of five tabs will be used, but the actual printing is done on nine tabs, the available space is almost cut in half. The tabs may be automatically formatted for the nine tabs.

According to the present invention the print shop operator first assembles all input (electronic and hardcopy) into a single electronic document at the job preparation station 116. In an exemplary embodiment, the Adobe Acrobat software program is used to identify the location of the tab sheets using a utility that works with the same application used to assemble the input (e.g. an Acrobat plug-in). This information is stored with the document. Using a utility that works with the same application used to assemble the input (e.g. an Acrobat plug-in), the tab label information is entered independent from the tab order. This will normally include the text and font. This information is stored with the document. The user then invokes the Tab Creator Tool. This brings up creator tool 1210. The user identifies the specific stock to use for the tabs. This identifies the order for the tabs. The document is then opened and read through the document starting with the first page through the last. For each tab sheet identified, the tab label information and tab location is taken based on the tab order and the tab sheet is created as an additional page to the document or on the selected page. Because the user can see the tabs in the document, it is in most cases not necessary to print a proof. Proofing the document is necessary with the prior art solution that depends upon counting pages. The amended document is then sent to the printing device as a proof set document. If, after examining the proof set document, the tab order needs to be changed, the user may recall the Tab Creator and change the stock that is used for the tabs and continue through the above steps until the desired output is obtained.

This configuration allows flexibility to align tab content at last possible time (i.e., print time). This preferred configuration also alleviates the creator of the document content from needing to know what ordered tab set will be used at print time. It is therefore intended that the foregoing detailed description be regarded as illustrative rather than limiting, and that it be understood that it is the following claims, including all equivalents, that are intended to define the spirit and scope of this invention.

The invention claimed is:

1. A printing method for locating tabs during a print job having multiple output sets, each said set including a plurality of sheets of tabbed ordered media having a repetitive sequence and a plurality of other sheets of media, the method comprising printing the print job, said printing including the steps of:

selecting from multiple tab layout templates each having a bank of tabbed stock;

loading a tab layout template to a list of tabbed ordered media having individual entries identifying each of the tabbed ordered media of said bank;

generating a new tab entry in a tab creator by cycling through said entries on said list wherein each entry is designated an active tab or an inactive tab such that said active tab location has a page number and said inactive tab location does not have a page number;

balancing said active tabs for referencing said tab layout template;

feeding said of tabbed ordered media into a media path through the printer to an output destination at designated tab locations;

determining if each of said of tabbed ordered media have been delivered to said output destination and discarding inactive tabs;

setting for every entry in tab layout template to a next said entry in said sheet list responsive to each said determining that a respective one of said of tabbed ordered media has been delivered; and repeating said loading, iterating, balancing, feeding, determining, discarding and setting steps for each of said output sets in full banks such that if there are entries in a bank not assigned to the table that a blank is entered into the table for the rest of the tab entries in that bank of tabs.

2. The method of claim 1 further comprising:

storing a template of banks of tabs;

storing a name identifying each template; and storing a position of each tab in each bank of tabs relative to the reference location of a document.

3. The method of claim 1 wherein the step of generating an inactive tab entry where the tab creator detects a blank line.

4. The method of claim 1 further comprising a step of selecting a style for a text on a tab comprising selecting a type of font and a size of font for the text.

5. The method of claim 1 wherein the step of balancing the tabs comprises evenly spacing the active tabs relative to the reference edge of the document.

6. The method of claim 1 wherein the step of discarding the unused tabs comprises sending the unused tabs to a purge exit in a printer.

* * * * *